(12) United States Patent
Wang et al.

(10) Patent No.: US 9,746,086 B2
(45) Date of Patent: Aug. 29, 2017

(54) TWO-INPUT AND TWO-OUTPUT VALVE CORE STRUCTURE

(71) Applicant: Xiamen Runner Industrial Corporation, Xiamen (CN)

(72) Inventors: Jinfa Wang, Xiamen (CN); Ronggui Zhang, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 0 days.

(21) Appl. No.: 14/996,912

(22) Filed: Jan. 15, 2016

(65) Prior Publication Data

US 2016/0230898 A1 Aug. 11, 2016

(30) Foreign Application Priority Data

Feb. 10, 2015 (CN) .................... 2015 2 0093842 U

(51) Int. Cl.
*F16K 11/078* (2006.01)
*F16K 11/074* (2006.01)
*F16K 3/08* (2006.01)

(52) U.S. Cl.
CPC ............ *F16K 3/08* (2013.01); *F16K 11/0787* (2013.01)

(58) Field of Classification Search
CPC .... F16K 3/08; F16K 11/0743; F16K 11/0787; Y10T 137/86549; Y10T 137/86831; Y10T 137/86558; E03C 1/0401; E03C 1/05
See application file for complete search history.

(56) References Cited

U.S. PATENT DOCUMENTS

| | | | | |
|---|---|---|---|---|
| 4,617,965 A | * | 10/1986 | Lorch ................ | F16K 11/0782 137/625.17 |
| 4,706,709 A | * | 11/1987 | Monch .............. | E03C 1/04 137/597 |
| 5,245,984 A | * | 9/1993 | Longmore .......... | F24D 17/0068 126/609 |
| 5,896,601 A | * | 4/1999 | Humpert ............ | F16K 11/0787 4/676 |
| 5,983,938 A | * | 11/1999 | Bowers .............. | C02F 1/003 137/625.17 |
| 6,364,210 B1 | * | 4/2002 | Lorch ................ | G05D 23/1353 137/625.17 |
| 6,517,720 B1 | * | 2/2003 | Aldred ............... | B01D 35/04 137/545 |
| 8,109,292 B2 | * | 2/2012 | Bolgar .............. | F16K 11/0787 137/597 |

(Continued)

*Primary Examiner* — Seth W Mackay-Smith
(74) *Attorney, Agent, or Firm* — Chun-Ming Shih

(57) ABSTRACT

A two-input and two-output valve core structure comprises: a hood-shape outer shell, and a sway plate sleeve, a sway plate, a movable porcelain plate, and a fixed porcelain plate disposed therein. Wherein the hood-shape outer shell is provided with an upper passage port and a lower passage port. The movable porcelain plate includes a detachable upper movable plate and a detachable lower movable porcelain plate. The fixed porcelain plate includes a detachable upper fixed porcelain plate, a detachable lower fixed plate. A middle section of the sway plate is hinged onto the sway plate sleeve, an upper sway head of the sway plate is protruded out of the upper passage port of the hood-shape outer shell, while a lower sway head of the sway plate is extended into an upper opening of the upper movable plate.

4 Claims, 5 Drawing Sheets

(56) References Cited

U.S. PATENT DOCUMENTS

| | | | | |
|---|---|---|---|---|
| 8,695,635 B1* | 4/2014 | Wang | ............... | F16K 11/0787 |
| | | | | 137/597 |
| 2006/0219304 A1* | 10/2006 | Di Nunzio | .......... | F16K 11/0787 |
| | | | | 137/625.4 |
| 2007/0044850 A1* | 3/2007 | Pieters | ............... | F16K 11/0787 |
| | | | | 137/597 |
| 2007/0295826 A1* | 12/2007 | Farrell | ............... | F24D 3/08 |
| | | | | 237/19 |

* cited by examiner

TWO-INPUT AND TWO-OUTPUT VALVE CORE STRUCTURE

BACKGROUND OF THE INVENTION

Field of the Invention

The present invention relates to a valve core structure, and in particular to a two-input and two-output valve core structure.

The Prior Arts

For the electric water heater presently available on the market, its functions and performances are affected by the pressure and quality of water provided by local water supply plant in a particular district. Since the water input of the electric water heater comes directly from the angle valve at the front end, while angle valve of a user usually remains constantly open. As such, the tank of the electric water heater is subjected to the water pressure coming from the water input end. Once such water pressure is increased, the safety valve is liable to be blocked due to the particles in the water, thus leading to water leakage or explosion of the tank, that could even endanger safety of the user.

Therefore, presently, the design and performance of the electric water heater is not quite satisfactory, and it has much room for improvement.

SUMMARY OF THE INVENTION

In view of the problems and drawbacks of the prior art, the present invention provides a two-input and two-output valve core structure, that is optimized in design, such that the valve core structure may utilize a valve core to control the input and output of the mixed water, while reducing the pressure exerted on the water heater. The two-input and two-output valve core structure can not only be used on the water heater, but it can also be used to control input and output of cold water, such as used in solar energy water heater and electric water heater. In this respect, in order to protect the tank of the electric water heater from being damaged by water of high pressure, the cold water entering into the electric water heater must first go through the control of the valve core, then the water is allowed to enter into the tank of the electric water heater, hereby eliminating the effect of unstable water pressure to the tank.

The present invention provides a two-input and two-output valve core structure, comprising: a hood-shape outer shell, and a sway plate sleeve, a sway plate, a movable porcelain plate, and a fixed porcelain plate disposed therein. Wherein, the hood-shape outer shell is provided with an upper passage port and a lower passage port. The movable porcelain plate includes a detachable upper movable plate and a detachable lower movable porcelain plate; a first sinking hole, disposed in a central portion on a lower surface of the lower movable porcelain plate; and a section of arc-shape sinking hole, provided on a side of the first sinking hole. The fixed porcelain plate includes a detachable upper fixed porcelain plate; a detachable lower fixed plate; four through hole channels provided on the lower fixed plate; four second sinking holes corresponding to the four through hole channels as provided on a lower surface of the upper fixed porcelain plate; and four penetrating holes, disposed on the upper surface of the upper fixed porcelain plate in communication with the four second sinking holes respectively. And the sway plate having its middle section hinged onto the sway plate sleeve, an upper sway head of the sway plate is protruded out of the upper passage port of the hood-shape outer shell, while a lower sway head of the sway plate is extended into an upper opening of the upper movable plate.

The four through hole channels of the lower fixed plate are connected respectively to a cold water output tube, and two water input tubes and a water output tube of mixed water leading to a water heater; while the four second sinking holes on the upper fixed porcelain plate correspond to the four through hole channels respectively.

The four penetrating holes on an upper surface of the upper fixed porcelain plate include a central penetrating hole, and three arc-shape penetrating holes on the sides of the central penetrating hole. Wherein, the central penetrating hole is connected through a second sinking hole, to the through hole channels on the lower fixed plate connecting the mixed water output tube, while the arc-shape sinking hole, the first arc-shape penetrating hole are connected through the second sinking hole, to the through hole channel on the lower fixed plate connecting the water heater, and the second and the third arc-shape penetrating holes are connected through two other second sinking holes, to the through hole channels on the lower fixed plate connecting the cold and hot water.

A slot channel is provided on the lower surface of the lower fixed plate for receiving a sealing ring.

Three lower protrusion plates are disposed around perimeter of the lower surface of the upper movable plate, while three indent slots corresponding to the three lower protrusion plates are disposed on the upper surface of the lower movable porcelain plate. Four upper protrusion plates are disposed around perimeter of an upper surface of the lower fixed plate, and four indent slots corresponding to the four upper protrusion plates are disposed around perimeter of the upper movable porcelain plate.

The operation principle of the two-input and two-output valve core structure are described in detail as follows:

After the handle is swayed to sway the upper sway head of the sway plate protruding out of the upper passage port, the lower sway head drives the upper movable plate, the lower movable porcelain plate to move horizontally, so that the first sinking hole is connected and in communication with the central penetrating hole, the second and third arc-shape penetrating holes. As such, cold water and hot water enter into the second and third arc-shape penetrating holes through two through hole channels. Then, cold water and hot water enter into the first sinking hole and the central penetrating hole to mix together. Subsequently, the mixed water is output through the second sinking hole and the through hole channel, while the channel leading to the water heater is not connected.

When the upper sway head is swayed slightly to the left or to the right, the temperature of the mixed water is controlled and adjusted through the size of connection area of the second and third arc-shape penetrating holes with the central penetrating hole. When the upper sway head is swayed a large angle to a side, the first arc-shape penetrating hole and the second arc-shape penetrating holes are connected and in communication through the arc-shape sinking hole; while the second and third arc-shape penetrating holes are not connected. As such, cold water passes through the first arc-shape penetrating hole, the arc-shape sinking hole, and the second arc-shape penetrating hole, to the second sinking hole and the through hole channel to output to the electric water heater.

The two-input and two-output valve core structure of the present invention is optimized in design, such that a valve core is able to control the input and output of the mixed water, and the water route leading to the electric water heater, thus reducing water pressure exerted on the electric water heater.

The two-input and two-output valve core structure of the present invention can not only be used as valve core in a water heater, but it can also be used to control input and output of cold water, such as an electric water heater or a solar energy water heater. In order to prevent the tank of water heater from being damaged by high pressure water, the cold water input of a water heater is designed to be controlled by a valve core first, then the cold water is allowed to enter into the tank of a water heater, to eliminate the adverse effect of unstable water pressure to the water heater.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
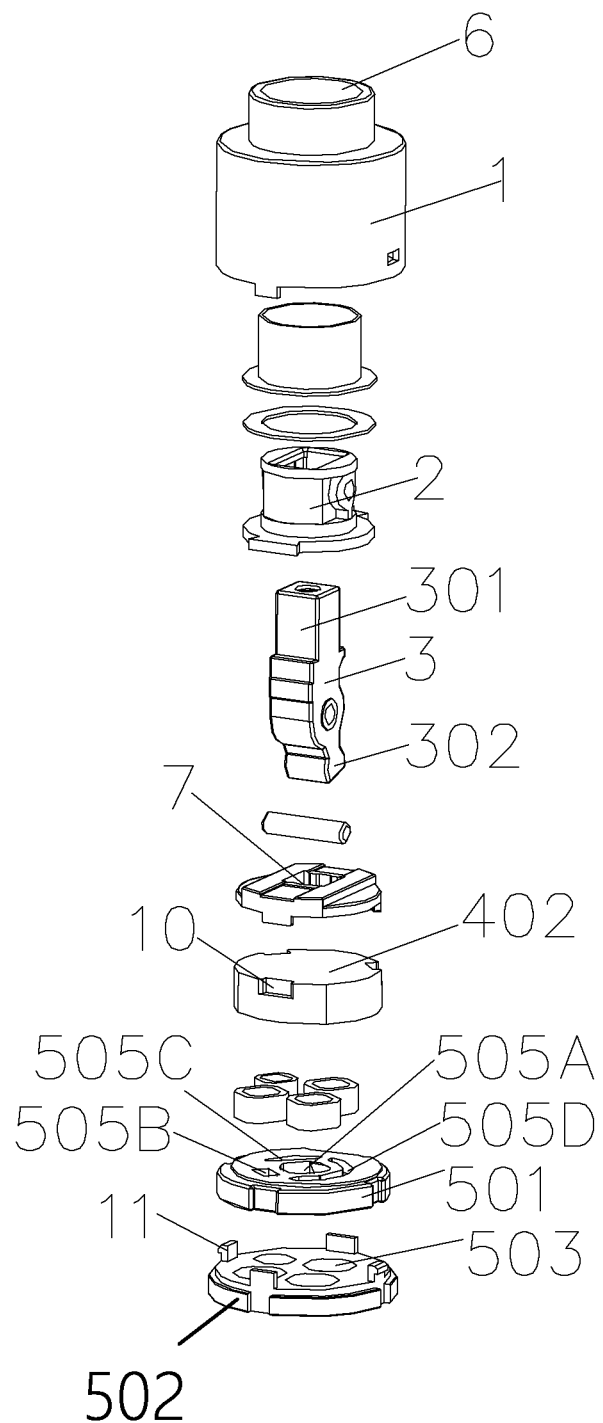
FIG. 1 is an exploded view of a two-input and two-output valve core structure according to an embodiment of the present invention.
Figure 2:
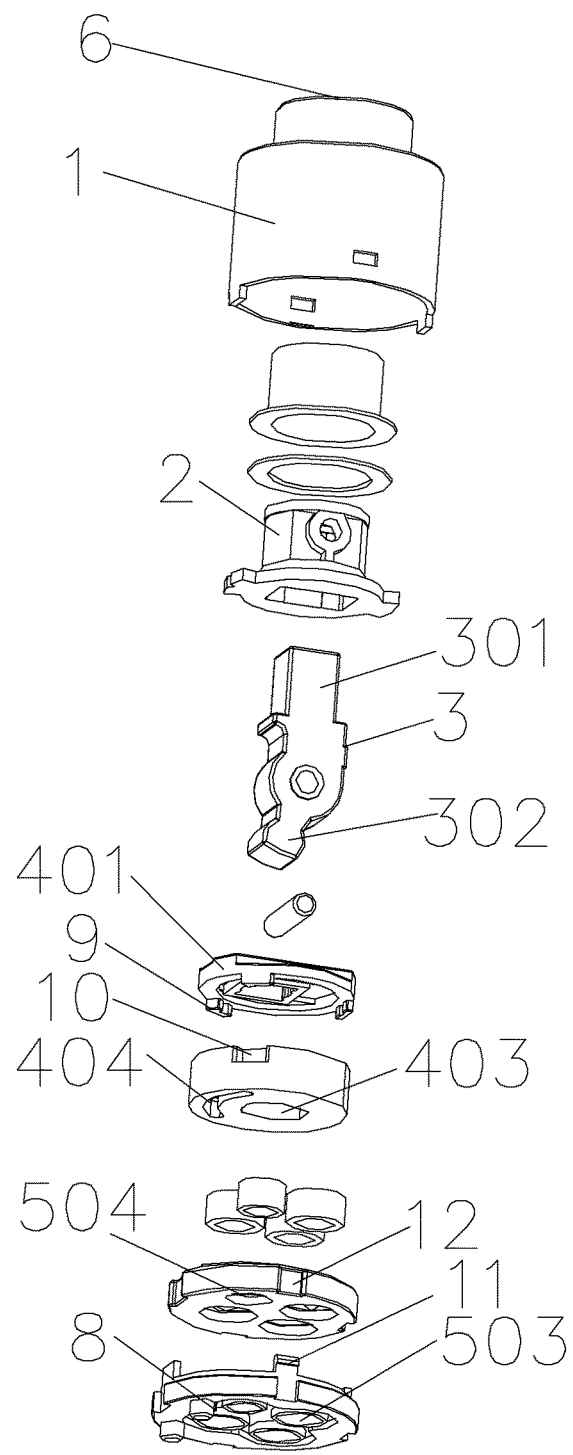
FIG. 2 is an exploded view of a two-input and two-output valve core structure as viewed from another angle according to an embodiment of the present invention.
Figure 3:
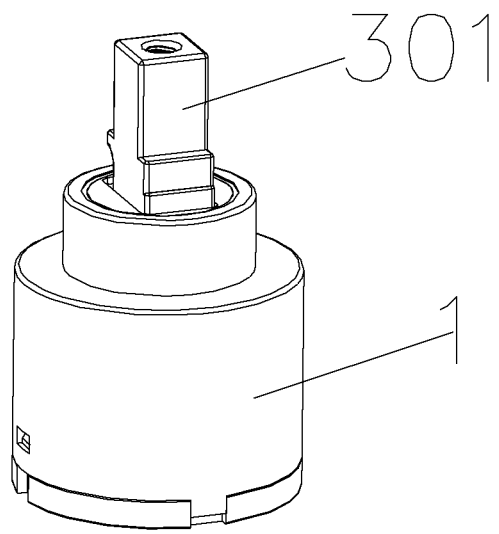
FIG. 3 is a perspective view of a two-input and two-output valve core structure according to an embodiment of the present invention.
Figure 4:
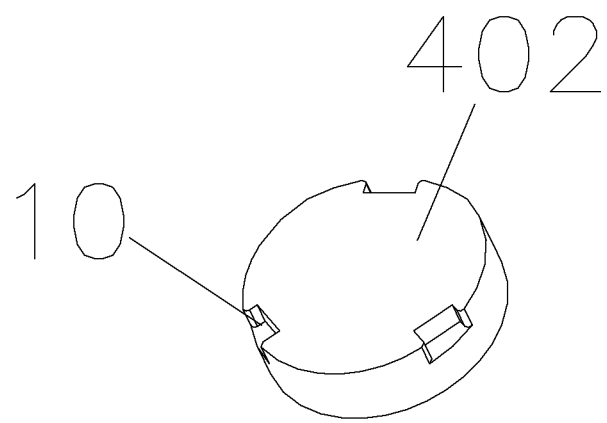
FIG. 4 is a perspective view of a lower movable porcelain plate according to an embodiment of the present invention.
Figure 5:
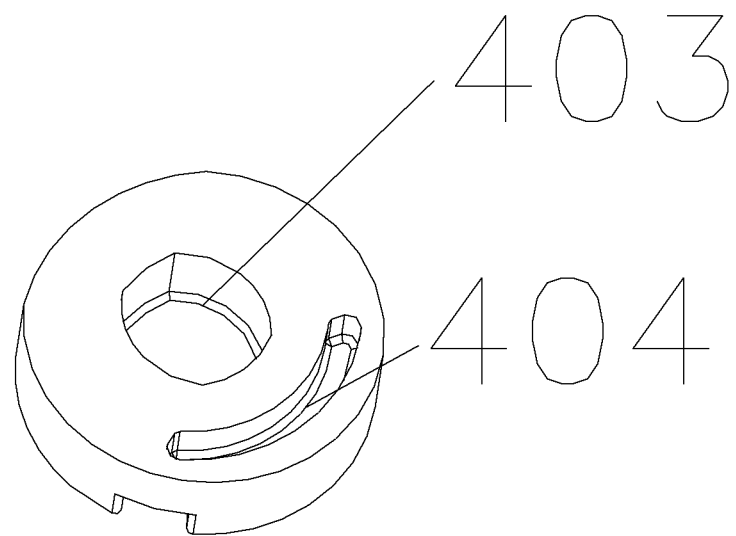
FIG. 5 is a perspective view of a lower movable porcelain plate viewed from another angle according to an embodiment of the present invention.
Figure 6:
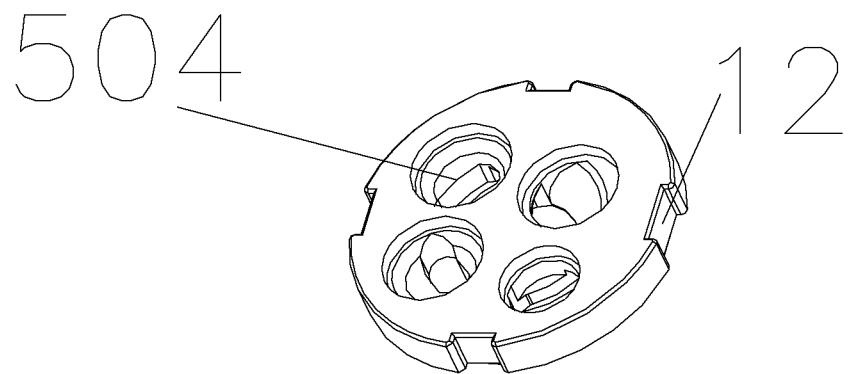
FIG. 6 is a perspective view of an upper fixed porcelain plate according to an embodiment of the present invention.
Figure 7:
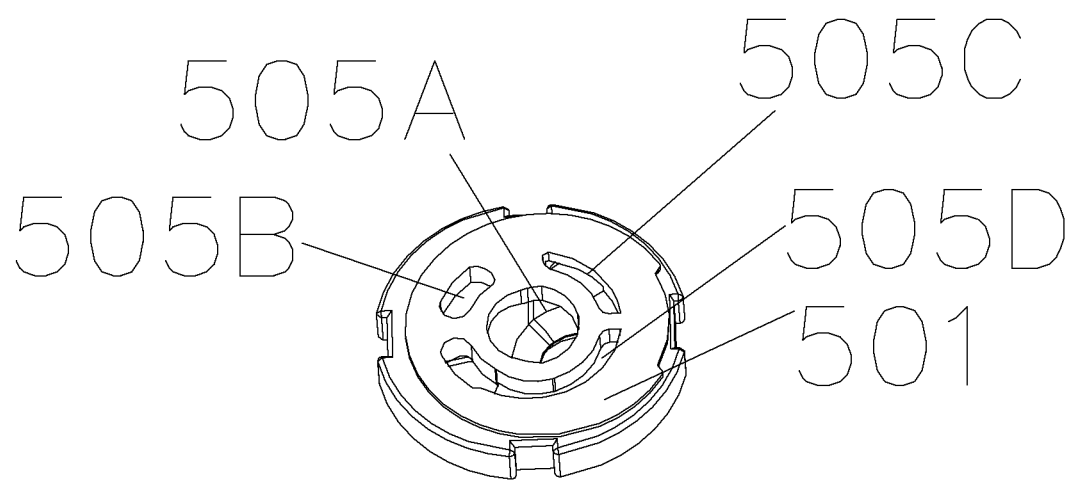
FIG. 7 is a perspective view of an upper fixed porcelain plate viewed from another angle according to an embodiment of the present invention.

Refer to FIGS. 1 to 7 respectively for an exploded view of a two-input and two-output valve core structure according to an embodiment of the present invention; an exploded view of a two-input and two-output valve core structure as viewed from another angle according to an embodiment of the present invention; a perspective view of a two-input and two-output valve core structure according to an embodiment of the present invention; a perspective view of a lower movable porcelain plate according to an embodiment of the present invention; a perspective view of a lower movable porcelain plate viewed from another angle according to an embodiment of the present invention; a perspective view of an upper fixed porcelain plate according to an embodiment of the present invention; and a perspective view of an upper fixed porcelain plate viewed from another angle according to an embodiment of the present invention.

As shown in FIGS. 1 to 7, the present invention provides a two-input and two-output valve core structure, comprising: a hood-shape outer shell 1, and a sway plate sleeve 2, a sway plate 3, a movable porcelain plate 4, and a fixed porcelain plate 5 disposed therein. Wherein the hood-shape outer shell 1 is provided with an upper passage port and a lower passage port. The movable porcelain plate 4 includes a detachable upper movable plate 401 and a detachable lower movable porcelain plate 402; a first sinking hole 403, disposed in a central portion on a lower surface of the lower movable porcelain plate 402; and a section of arc-shape sinking hole 404, provided on a side of the first sinking hole 403. The fixed porcelain plate 5 includes a detachable upper fixed porcelain plate 501; a detachable lower fixed plate 502; four through hole channels 503 provided on the lower fixed plate 502; four second sinking holes 504 corresponding to the four through hole channels, provided on a lower surface of the upper fixed porcelain plate 501; and four penetrating holes 505A, 505B, 505C,505D, disposed on the upper surface of the upper fixed porcelain plate 501 in communication with the four second sinking holes 504 respectively. And the sway plate 3 having its middle section hinged onto the sway plate sleeve 2, an upper sway head 301 of the sway plate 3 is protruded out of the upper passage port 6 of the hood-shape outer shell 1, while a lower sway head 302 of the sway plate 3 is extended into an upper opening 7 of the upper movable plate 401.

The four through hole channels 503 of the lower fixed plate 502 are connected respectively to a cold water output tube, and two water input tubes and a water output tube of mixed water leading to the water heater; while the four second sinking holes 504 on the upper fixed porcelain plate 501 correspond to the four through hole channels 503 respectively.

The four penetrating holes 505 on an upper surface of the upper fixed porcelain plate 501 include a central penetrating hole 505A, and three arc-shape penetrating holes on sides of the central penetrating hole 505A. Wherein, the central penetrating hole 505A is connected through a second sinking hole 504, to the through hole channels on the lower fixed plate 502 connecting the mixed water output tube; while the arc-shape sinking hole 404, the first arc-shape penetrating hole 505B are connected through the second sinking hole 504, to the through hole channel on the lower fixed plate 502 connecting to the water heater; and the second and the third arc-shape penetrating holes 505C, 505D are connected through two other second sinking holes 504, to the through hole channels on the lower fixed plate 502 connecting to the cold water and hot water.

A slot channel 8 is provided on the lower surface of the lower fixed plate 502 for receiving a sealing ring.

Three lower protrusion plates 9 are disposed around perimeter of the lower surface of the upper movable plate 401, while three indent slots 10 corresponding to the three lower protrusion plates 9 are disposed on the upper surface of the lower movable porcelain plate 402. Four upper protrusion plates 11 are disposed around perimeter of upper surface of the lower fixed plate 502, and four indent slots 12 corresponding to the four upper protrusion plates 11 are disposed around perimeter of the upper movable plate 401.

The operation principle of the two-input and two-output valve core structure are described in detail as follows:

After the handle is swayed to sway the upper sway head of the sway plate 3 protruding out of the upper passage port, the lower sway head drives the upper movable plate 401, the lower movable porcelain plate 402 to move horizontally, so that the first sinking hole 403 is connected and in communication with the central penetrating hole 505A, the second and third arc-shape penetrating holes 505C and 505D. As such, cold water and hot water flow into the second and third arc-shape penetrating holes 505C and 505D through two through hole channels. Then, cold water and hot water flow into the first sinking hole 403 and the central penetrating hole 505A to mix together. Subsequently, the mixed water is output through the second sinking hole 504 and the through hole channel, while the channel leading to the water heater is not connected.

When the upper sway head is swayed slightly to the left or to the right, the temperature of the mixed water is controlled through the size of connection area of the second and third arc-shape penetrating holes 505C and 505D with the central penetrating hole 505A. When the upper sway head is swayed a large angle to a side, the first arc-shape penetrating hole 505B and the second arc-shape penetrating holes 505C are connected and in communication through arc-shape sinking hole 404; while the second and third arc-shape penetrating holes 505C and 505D are not connected. As such, cold water passes through the first arc-shape penetrating hole 505B, the arc-shape sinking hole 404, and the second arc-shape penetrating hole 505C, to the second sinking hole 504 and the through hole channel to output to the water heater.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A two-input and two-output valve core structure, comprising:
    a hood-shape outer shell, and a sway arm sleeve, a sway arm, a movable porcelain plate, and a fixed porcelain plate disposed therein;
    wherein the hood-shape outer shell is provided with an upper passage port and a lower passage port; the movable porcelain plate includes a detachable upper movable plate, a detachable lower movable porcelain plate, a first sinking hole disposed in a central portion on a lower surface of the lower movable porcelain plate, a section of arc-shape sinking hole provided on a side of the first sinking hole; the fixed porcelain plate includes a detachable upper fixed porcelain plate and a detachable lower fixed plate, four through hole channels provided on the lower fixed plate, four second sinking holes corresponding to the four through hole channels are provided on a lower surface of the upper fixed porcelain plate, and four penetrating holes disposed on the upper surface of the upper fixed porcelain plate in communication with the four second sinking holes respectively; and
    the sway arm having its middle section hinged onto the sway arm sleeve, an upper sway head of the sway arm is protruded out of the upper passage port of the hood-shape outer shell, while a lower sway head of the sway arm is extended into an upper opening of the upper movable plate,
    wherein the four penetrating holes on an upper surface of the upper fixed porcelain plate include a central penetrating hole, a first arc-shape penetrating hole, a second arc-shape penetrating hole, and a third arc-shape penetrating hole; wherein, the central penetrating hole communicates with one of the four through hole channels through one of the four second sinking holes, while the arc-shape sinking hole and the first arc-shape penetrating hole communicate with one of the four through hole channels through one of the second sinking holes; the second and the third arc-shape penetrating holes communicate with two of the four through hole channels through two of the second sinking holes, respectively; and
    wherein the first sinking hole is configured to communicate with the central penetrating hole, the second arc-shape penetrating hole, and the third arc-shape penetrating hole, while the arc-shape sinking hole is configured to communicate with the first arc-shape penetrating hole and the second arc-shape penetrating hole, such that the first arc-shape penetrating hole only allows cold water supplied from the second arc-shape penetrating hole to flow therein, and the central penetrating hole allows cold water and hot water supplied from the second arc-shape penetrating hole and the third arc-shape penetrating hole to flow therein.

2. The two-input and two-output valve core structure as claimed in claim 1, wherein the four through hole channels of the lower fixed plate are connected respectively to a cold water output tube, and two water input tubes and a water output tube of mixed water leading to a water heater; while the four second sinking holes on the upper fixed porcelain plate correspond to the four through hole channels respectively.

3. The two-input and two-output valve core structure as claimed in claim 1, wherein a slot channel is provided on the lower surface of the lower fixed plate for receiving a sealing ring.

4. The two-input and two-output valve core structure as claimed in claim 1, wherein three lower protrusion plates are disposed around perimeter of the lower surface of the upper movable plate, while three indent slots corresponding to the three lower protrusion plates are disposed on the upper surface of the lower movable porcelain plate; four upper protrusion plates are disposed around perimeter of an upper surface of the lower fixed plate, and four indent slots corresponding to the four upper protrusion plates are disposed around perimeter of the upper movable porcelain plate.

* * * * *